United States Patent
Parekh et al.

(10) Patent No.: US 12,363,189 B2
(45) Date of Patent: Jul. 15, 2025

(54) COMPUTING CLUSTER LOAD BALANCER

(71) Applicant: Hewlett Packard Enterprise Development LP, Spring, TX (US)

(72) Inventors: Hardik Dhirendra Parekh, Bangalore (IN); Pradeep Kumar Achi Vasudevan, Bangalore (IN); Sonu Sudhakaran, Bangalore (IN)

(73) Assignee: Hewlett Packard Enterprise Development LP, Spring, TX (US)

( * ) Notice: Subject to any disclaimer, the term of this patent is extended or adjusted under 35 U.S.C. 154(b) by 59 days.

(21) Appl. No.: 18/325,439

(22) Filed: May 30, 2023

(65) Prior Publication Data

US 2024/0406254 A1    Dec. 5, 2024

(51) Int. Cl.
*H04L 67/1008* (2022.01)
*H04L 67/101* (2022.01)
*H04L 67/56* (2022.01)

(52) U.S. Cl.
CPC ........ *H04L 67/1008* (2013.01); *H04L 67/101* (2013.01); *H04L 67/56* (2022.05)

(58) Field of Classification Search
CPC .... H04L 67/1008; H04L 67/101; H04L 67/56
See application file for complete search history.

(56) References Cited

U.S. PATENT DOCUMENTS

| | | | |
|---|---|---|---|
| 10,778,798 B2 | 9/2020 | Parekh | |
| 10,827,020 B1 | 11/2020 | Cao et al. | |
| 10,848,552 B2 | 11/2020 | Shimoga Manjunatha et al. | |
| 10,949,239 B2 | 3/2021 | Gupta et al. | |
| 11,169,856 B2 | 11/2021 | Parekh et al. | |
| 11,316,822 B1* | 4/2022 | Gawade | G06F 9/455 |
| 2018/0139174 A1* | 5/2018 | Thakkar | H04L 61/5061 |
| 2020/0099610 A1* | 3/2020 | Heron | H04L 45/34 |
| 2020/0137029 A1 | 4/2020 | Sakthievel et al. | |
| 2021/0152631 A1* | 5/2021 | Ravindra | H04L 67/1029 |
| 2022/0038379 A1* | 2/2022 | Boutros | H04L 45/52 |

OTHER PUBLICATIONS

Karrier.io, "ExternalDNS / Automatic DNS Management on Kubernetes," https://medium.com/@karrier_io/externaldns-automatic-dns-management-on-kubernetes-4fd71c6a4387, Sep. 13, 2018, 5 pages.

Patel, A., "Kubernetes—Service Types Overview," https://medium.com/devops-mojo/kubernetes-service-types-overview-introduction-to-k8s-service-types-what-are-types-of-kubernetes-services-ea6db72c3f8c, Jul. 1, 2021, 9 pages.

* cited by examiner

*Primary Examiner* — Aftab N. Khan
(74) *Attorney, Agent, or Firm* — Trop, Pruner & Hu, P.C.

(57) ABSTRACT

In an example implementation consistent with the features disclosed herein, a tenant service in an internal network is made accessible to clients in an external network through a load balancer service. A request is transmitted by a tenant computing cluster in response to discovering creation of the tenant service at the tenant computing cluster. The request is received by a gateway computing cluster. The load balancer service is deployed at the gateway computing cluster in response to receiving the request. An external IP address for the external network is assigned to the load balancer service. The load balancer service is configured to forward client requests received at the external IP address to the tenant service. The external IP address is then sent to the tenant computing cluster.

20 Claims, 6 Drawing Sheets

COMPUTING CLUSTER LOAD BALANCER

BACKGROUND

Container orchestration may be used for automating the deployment, scaling, and management of applications. A container management system may be used to perform container orchestration. A container management system may include a set of primitives that are collectively used for container orchestration across a computing cluster of computing nodes. A computing cluster includes one or more manager nodes (which are part of a control plane) and one or more worker nodes (which are part of a data plane). A manager node of a computing cluster can distribute workloads to worker nodes of the computing cluster, manage the transfer of workloads between the worker nodes, scale workloads up or down, and/or the like by orchestrating application containers on the worker nodes. Application containers are a form of operating system virtualization, where a container includes the minimum operating system resources, memory, and dependencies to run an application.

BRIEF DESCRIPTION OF THE DRAWINGS

Aspects of the present disclosure are best understood from the following detailed description when read with the accompanying figures.

Corresponding numerals and symbols in the different figures generally refer to corresponding parts unless otherwise indicated. The figures are drawn to clearly illustrate the relevant aspects of the disclosure and are not necessarily drawn to scale.

DETAILED DESCRIPTION

The following disclosure provides many different examples for implementing different features. Specific examples of components and arrangements are described below to simplify the present disclosure. These are, of course, merely examples and are not intended to be limiting.

Container management systems are suitable for orchestrating cloud computing workloads, and so may be used in public clouds (which may be publicly accessible) and/or private clouds (which may not be publicly accessible). For example, a container management system may be used at an on-premises data center for an enterprise to orchestrate containers across a cluster of on-premises nodes. An on-premises data center typically has an internal network, which is a private network used for communication within the data center. To maintain security of the data center, an internal network is generally secured against external access. However, the enterprise may desire to make a service running at an on-premises computing cluster accessible from an external network. An external network is a network that is external to the internal network of the data center. For example, the external network may be another private network of the enterprise, may be a public network such as the Internet, or the like.

In an example implementation consistent with the features disclosed herein, a tenant service in an internal network is made accessible to clients in an external network through a load balancer service, which is at an edge of the internal network and the external network. The tenant service is running at a tenant computing cluster, and the load balancer service is running at a gateway computing cluster that is different than the tenant computing cluster. The load balancer service includes a reverse proxy. As subsequently described in greater detail, the load balancer service will be automatically deployed at the gateway computing cluster when the tenant service is created at the tenant computing cluster. During deployment, the reverse proxy of the load balancer service is configured to forward requests from clients in the external network to the tenant service in the internal network. Accordingly, the tenant service may be externally accessed without exposing the rest of the internal network to the clients in the external network. Thus, security of the internal network may advantageously be maintained while still allowing the tenant service to be accessed from the external network. Operation of a data center may thus be improved.

The computing clusters may be provided by a container management system. Such systems provide a platform for automating deployment, scaling, and operations of application containers across computing clusters of worker nodes. Computing cluster resources or components may be created, grouped, updated, and/or deleted, which operations may be automated. The basic scheduling unit of a container management system is a pod, which adds a higher level of abstraction by grouping containerized components. A pod includes containers that are co-located on the same worker node and can share resources. A service (e.g., a computing cluster service), which is an abstraction of the resources of a computing cluster, may be created at a computing cluster. A service includes one or more pods that work together to provide a function. A computing cluster may also include one or more controllers. A controller (e.g., a computing cluster controller) includes a control loop that watches the state of a computing cluster to track a resource of the computing cluster, and automatically makes or request changes to the computing cluster based on the state of the resource.

The tenant computing cluster includes a load balancer worker, which may be a computing cluster controller. The load balancer worker watches for the creation of a tenant service at the tenant computing cluster. Upon creation of the tenant service, the load balancer worker sends a request for a load balancer service to the gateway computing cluster. The gateway computing cluster includes a load balancer manager, which may be a computing cluster controller. The load balancer manager receives the request from the tenant computing cluster and deploys a load balancer service at the gateway computing cluster in response to the request. The request from the tenant computing cluster includes the internal Internet Protocol (IP) address and port of the tenant service on the internal network. The load balancer service includes a reverse proxy, which is configured during deployment by the load balancer manager to forward requests from clients in the external network to the internal IP address and port of the tenant service. Additionally, the load balancer manager is adapted to obtain an external IP address and assign it to the load balancer service. Thus, requests from clients in the external network are received by the load balancer service at the external IP address, and those requests are then forwarded by the reverse proxy of the load balancer service to the internal IP address and port of the tenant service. Accordingly, requests may be made from clients in an external network to the tenant service in the internal network without exposing other components of the internal network to the external network.

Some variations are contemplated. In another example implementation, the external network is a public network such as the Internet, and a load balancer service is automatically deployed at a cloud computing cluster in the public network, in a similar manner as the automatic deployment of the load balancer service at the gateway computing cluster. A client request to the load balancer service of the cloud computing cluster may be forwarded to the load balancer service of the gateway computing cluster, which is then forwarded to the tenant service of the tenant computing cluster. As a result, requests from clients on the Internet may be made to the tenant service in the internal network without exposing other components of the internal network to the Internet. In yet another example implementation, a cloud computing cluster may load balance requests to multiple different gateway computing clusters in different internal networks. The different gateway computing clusters may be located remotely from one another, such as located in different geographic areas or countries. Site-level high availability may thus be obtained across different geographic areas, thereby improving reliability of a private cloud.

Figures 1A, 1B:
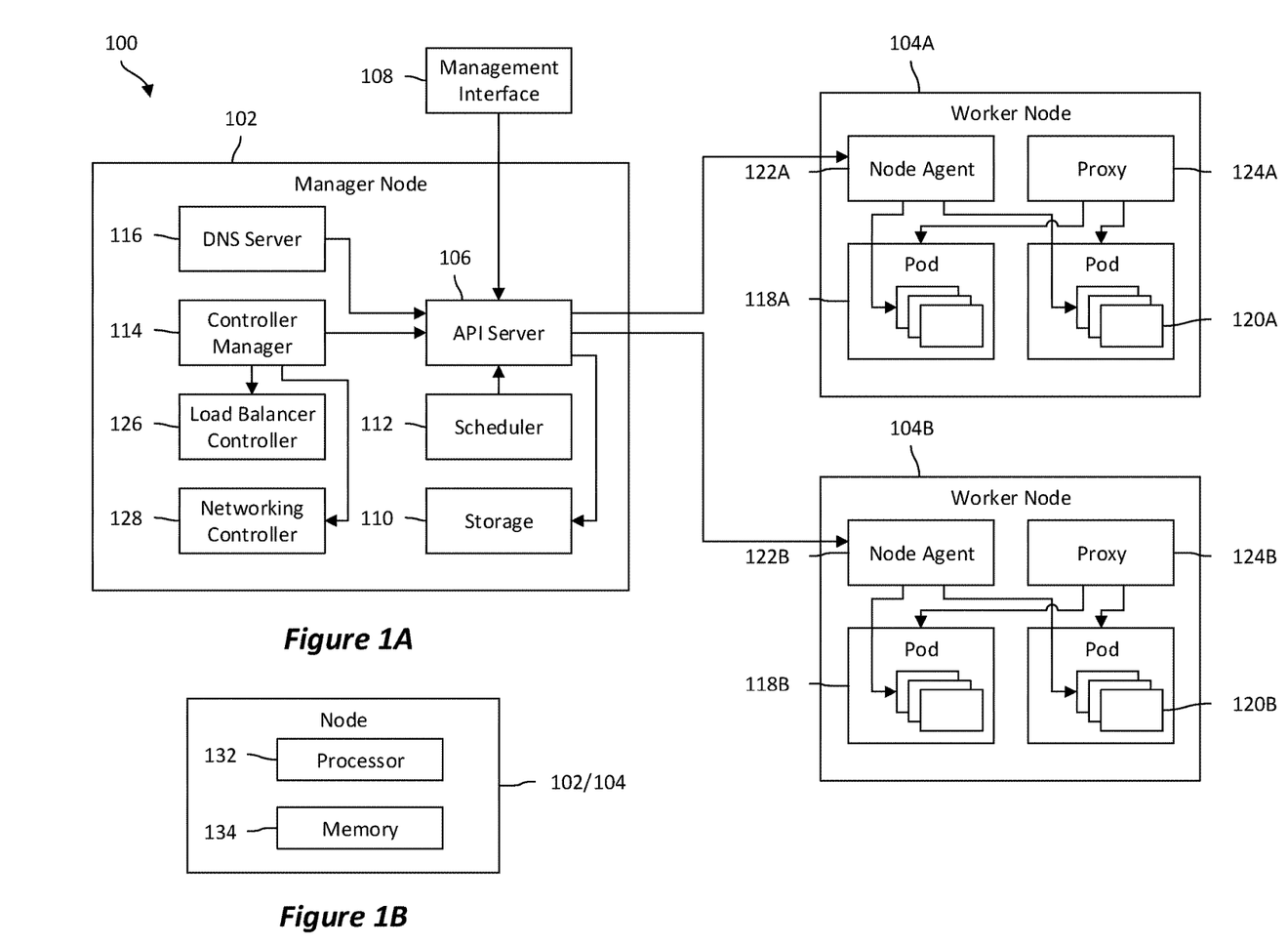
FIGS. 1A-1B are schematic diagrams of a computing cluster, according to some implementations.

FIGS. 1A-1B are schematic diagrams of a computing cluster 100, according to some implementations. FIG. 1A is a diagram of components of the computing cluster 100 and FIG. 1B is a diagram of a computing node of the computing cluster 100. Referring to FIG. 1A, the computing cluster 100 includes a manager node 102, which is responsible for managing the computing cluster 100, and multiple worker nodes 104 (including a first worker node 104A and a second worker node 104B) within which the components of the computing cluster 100 are adapted to perform a requested computing cluster operation. Examples of such requested computing cluster operations can include operations to create an application deployment, delete an application deployment, update an application deployment, and the like. In an example implementation, the computing cluster 100 is a Kubernetes® Cluster.

The manager node 102 is the entry point of administrative tasks for the computing cluster 100 and is responsible for orchestrating the worker nodes 104, within which the components of the computing cluster 100 for generating a computing cluster operation are located. The manager node 102 includes an API server 106 that provides both the internal and external interface for access to the computing cluster 100 via the manager node 102. The API server 106 receives commands from a management interface 108. The commands may be representational state transfer (REST) command requests. The management interface 108 may be a command line interface tool, such as kubectl in implementations where the computing cluster 100 is a Kubernetes® Cluster. The API server 106 processes the commands from the management interface 108, validates the commands, and executes logic specified by the commands.

The results of the commands processed by the API server 106 may be stored in a storage component 110. The storage component 110 may be a distributed key-value store, such as an etcd storage component, which may be included with the manager node 102. The storage component 110 stores configuration data of the computing cluster 100, representing the state of the computing cluster 100 (e.g., what pods exist, what pods should be running, which nodes should the pods be running on, etc.). The storage component 110 provides storage for the commands received by the API server 106 to perform create-read-update-and-delete (CRUD) operations as well as an interface to register watchers on specific nodes, thereby providing a reliable way to notify the rest of the computing cluster 100 about configuration changes within the computing cluster 100. For example, the information in the storage component 110 enables the manager node 102 to be notified about configuration changes such as jobs being scheduled, created, and deployed; pod/service details and states; namespaces and replication information; and the like.

The manager node 102 also includes a resource scheduler 112 and a controller manager 114. The resource scheduler 112 is adapted to deploy pods (and thus applications) onto the worker nodes 104. The resource scheduler 112 includes information regarding available resources on the computing cluster 100, as well as resources utilized for the applications to run. This information is used by the resource scheduler 112 to make decisions about where to deploy a specific application. The controller manager 114 manages controllers of the computing cluster 100. A controller uses the API server 106 to watch the state of one or more resource(s) of the computing cluster 100 and automatically make changes to the computing cluster 100 based on the state of the resource(s). For example, a controller may use the API server 106 to make changes to the current state of the computing cluster 100 to change the current state to another state, re-create a failed pod, remove an extra-scheduled pod, etc. In addition, the manager node 102 may include a DNS server 116, which serves DNS records for the components (e.g., pods and services) of the computing cluster 100. The node agents of the worker nodes 104 may use the DNS server 116 to resolve domain names.

Pods 118 (including first pods 118A and second pods 118B) are co-located in each of the worker nodes 104. Containers 120 (including first containers 120A and second containers 120B) reside within respective ones of the pods 118. The containers 120 are co-located on respective ones of the worker nodes 104 where the respective pods 118 are running, and may share resources. A pod 118 is a group of containerized components that share resources such as storage, namespaces, control groups, IP addresses, and the like. Each of the pods 118 is assigned an IP address within the computing cluster 100. A pod 118 may include a volume, such as a local disk directory or a network disk, and may expose the volume to the containers 120 within the pod 118. The pods 118 may be managed manually through the API server 106, or the management of the pods 118 may be automatically performed by a controller (managed by the controller manager 114).

The containers 120 include the minimum operating system resources, memory, and dependencies to run an application. Examples of the dependencies include files, environment variables, libraries, and the like. The host operating system for a worker node 104 constrains access of the containers 120 to physical resources of the worker node 104, such as CPUs, storage, memory, and the like. The worker nodes 104 may use virtualization to run the containers 120.

The pods 118 included in a worker node 104 are created, destroyed, and recreated based on the state of the computing cluster 100. Thus, the pods 118 may not be persistent or exist for a long period of time. Because of the relatively short lifespan of the pods 118, the IP address that they are served on may change. To facilitate communication with the pods 118 even when their IP addresses change, a service may be defined for certain pods 118. A service is an abstraction of a group of pods 118, typically using a proxy. A virtual IP address may be assigned to a service in order for other components to communicate with the service via the virtual IP address. Load balancing may be set up for at least some of the pods 118 so that the pods 118 may be exposed via a service. The pods 118 can be recreated and have changes to their corresponding IP protocol without the virtual IP address of the service being changed. Therefore, a service may be created having a stable IP address and DNS name, which can be used by other pods 118 to communicate with the service. For example, consider an image-processing back-end which is running with three replicas. Those replicas are fungible, in that a front-end does not care which image-processing back-end is used. While the pods 118 that compose the back-end set may change, the front-end clients, by communicating with the back-end via a service, may be unaware of those changes, such that the front-end clients do not keep track of a list of the back-end set. Each service of the containers 120 may be assigned a DNS name that identifies the pods 118 within which the service resides.

Each of the worker nodes 104 includes a node agent 122 (including a first node agent 122A and a second node agent 122B). A node agent 122 is in communication with the manager node 102 and receives details for the configuration of the pods 118 from the API server 106. The node agent 122 uses the received details to ensure that the containers 120 are constructed and operating as intended. In addition, the node agent 122 may also receive information about services from the storage component 110 to obtain information related to services and to create details related to newly created services.

Additionally, each of the worker nodes 104 includes a proxy 124 (including a first proxy 124A and a second proxy 124B). Each proxy 124 functions as a network proxy, or hub through which requests are transferred, and as a load balancer for a service on a worker node 104 to reverse proxy and distribute network traffic across the containers 120. The proxies 124 are used to increase capacity and reliability of applications and to perform network routing for transmission control protocol (TCP) packets and user data protocol (UDP) packets. The proxies 124 route traffic to the appropriate container 120 in order to enable access to a service based on a virtual IP address of the service. The proxies 124 may also perform numbering of incoming requests, and that information may be used for creating a computing cluster operation. In this way, the components of the worker nodes 104 may be combined together and identified so that when an application is to be deployed, the components for creating and running the application are located throughout the worker nodes 104. If any of the worker nodes 104 are added or removed, the computing cluster 100 is able to create or deploy the application by combining components from different worker nodes 104 or using a combination of different components within the worker nodes 104.

In order to perform cluster operations in a container management system, a deployment configuration that provides instructions on how to create and update components for performing a cluster operation can be input to the manager node 102 via the management interface 108. Once the instructions on how to create and update the components for performing the cluster operation have been received by the manager node 102, the API server 106 schedules the cluster operation onto the worker nodes 104 to perform the cluster operation using a combination of multiple different components within multiple different containers 120 of multiple different pods 118. In this way, the cluster operation is performed using a combination of components located in multiple containers 120 located within one or more of the pods 118 within one or more of the worker nodes 104.

Once a cluster operation has been scheduled, the manager node 102 monitors the pods 118. If the manager node 102 determines that a resource used for the cluster operation located within one of the containers 120 of the pods 118 goes down or is deleted, the manager node 102 replaces the deleted or nonoperating pod 118 associated with the cluster operation using a different combination of the currently available resources within the containers 120 of the pods 118. In this way, the API server 106 monitors the functionality of the pods 118, and when the pods 118 no longer function as intended, recreates the pod 118.

As subsequently described in greater detail, multiple computing clusters 100 will be utilized to expose, to an external network, a service running on a computing cluster in an internal network. Specifically, a tenant service (which is part of a tenant computing cluster) in the internal network is made accessible to clients in the external network through a load balancer service (which is part of a gateway computing cluster). The tenant service will be made accessible by automatically deploying a load balancer service at the gateway computing cluster, and configuring the load balancer service to forward requests from clients in the external network to the tenant service in the internal network. Each computing cluster 100 further includes a load balancer controller 126 and a networking controller 128, which are managed by the controller manager 114. The load balancer controller 126 and the networking controller 128 may each be Kubernetes® Controllers in implementations where the computing cluster 100 is a Kubernetes® Cluster. The load balancer controller 126 of each computing cluster 100 will be used to coordinate automatic deployment of a load balancer service. The networking controller 128 of each computing cluster 100 will be used to obtain an external IP address for the load balancer service. The operation of the load balancer controller 126 and the networking controller 128 will be subsequently described in greater detail.

The nodes of the computing cluster 100 (e.g., the manager node 102 and the worker nodes 104) may each include suitable components. Suitable components include a processor, an application-specific integrated circuit, a microcontroller, memory, and the like. The nodes of the computing cluster 100 may each be physical devices, e.g., computers. For example, and referring to FIG. 1B, the manager node 102 and the worker nodes 104 may each include a processor 132 and a memory 134. The memory 134 may be a non-transitory computer readable medium storing instructions for execution by the processor 132. One or more modules within the nodes of the computing cluster 100 may be partially or wholly embodied as software and/or hardware for performing any functionality described herein.

Figure 2:
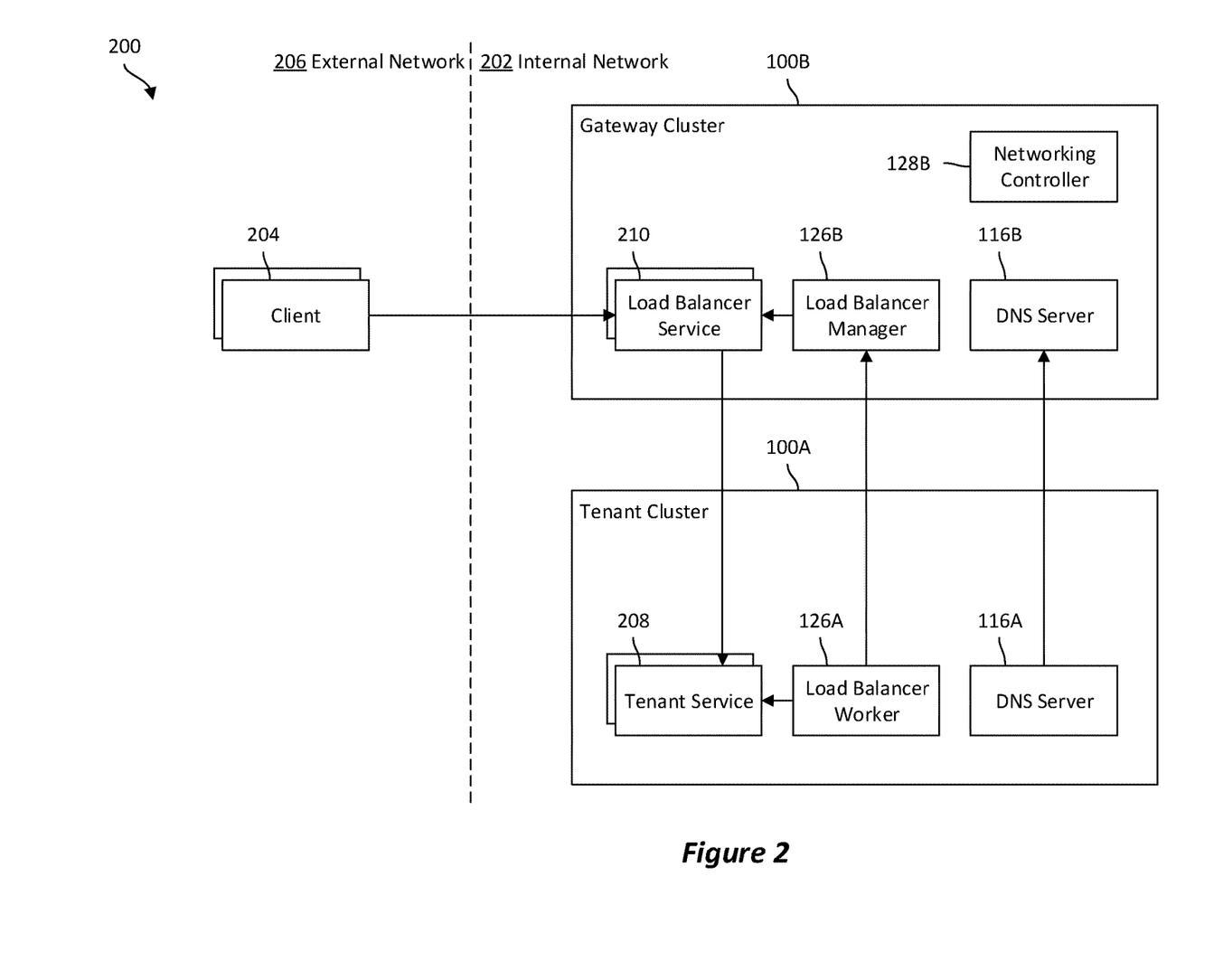
FIG. 2 is a schematic diagram of a computing cluster load balancer system, according to some implementations.

FIG. 2 is a schematic diagram of a computing cluster load balancer system 200, according to some implementations. In the computing cluster load balancer system 200, a service in an internal network 202 is made accessible to clients 204 in an external network 206. In this implementation, the internal network 202 is a private network used for communication within a data center of an enterprise, and the external network 206 is another private network of the enterprise that is external to the internal network 202. The internal network 202 may be for a private cloud. The internal network 202 and the external network 206 may be part of different VLANs.

The computing cluster load balancer system 200 includes a tenant computing cluster 100A and a gateway computing cluster 100B in the internal network 202, where the gateway computing cluster 100B is at an edge of the internal network 202 and the external network 206. The tenant computing cluster 100A and the gateway computing cluster 100B are each similar to the computing cluster 100 of FIG. 1A. As subsequently described in greater detail, a tenant service 208 will be created at the tenant computing cluster 100A, while a load balancer service 210 will be created at the gateway computing cluster 100B. The tenant service 208 may be any desired front-end or back-end service. The tenant service 208 is an abstraction of the resources of the tenant computing cluster 100A, e.g., includes a plurality of pods of the tenant computing cluster 100A. Similarly, the load balancer service 210 includes a plurality of pods of the gateway computing cluster 100B. The tenant service 208 will be exposed to the clients 204 through the load balancer service 210.

The tenant computing cluster 100A further includes a load balancer worker 126A, while the gateway computing cluster 100B further includes a load balancer manager 126B. The load balancer worker 126A and the load balancer manager 126B are each similar to the load balancer controller 126 of FIG. 1A, except are adapted to perform different control loops. The load balancer worker 126A and the load balancer manager 126B work together to automatically deploy the load balancer service 210 for the tenant service 208 upon creation of the tenant service 208.

During operation, the load balancer worker 126A watches for the creation of the tenant service 208. The tenant service 208 may be created through a management interface of the tenant computing cluster 100A. In an example implementation, the tenant service 208 is a Kubernetes® Service of LoadBalancer service type, and the load balancer worker 126A watches for the creation of a service of LoadBalancer service type. When a Kubernetes® Service of LoadBalancer service type is created, an underlying Kubernetes® Service of NodePort service type is also created. Accordingly, when the tenant service 208 is created, the tenant computing cluster 100A obtains an IP address and a port number for accessing the newly created service. The tenant service 208 may thus be reached, on the internal network 202, at that IP address and a port number.

When the load balancer worker 126A discovers the creation of the tenant service 208, it sends a request for a load balancer service to the load balancer manager 126B. The request includes the internal IP address and port number, for the internal network 202, of the tenant service 208. In response to receiving the request, the load balancer manager 126B deploys the load balancer service 210. The load balancer service 210 includes a reverse proxy. The reverse proxy may be an nginx web server or the like. For example, the load balancer service 210 may include a plurality of pods, which include containers for nginx web server(s), and deploying the load balancer service 210 may include deploying those containers. In an example implementation, the load balancer service 210 is a Kubernetes® Service of LoadBalancer service type. The load balancer manager 126B then configures the reverse proxy (e.g., the nginx web server(s)) of the load balancer service 210, such as by automatically editing the configuration file(s) of the nginx web server(s). Specifically, the internal IP address and port number of the tenant service 208 are specified as the back-end server for the reverse proxy. Additionally, the load balancer manager 126B assigns an external IP address from the external network 206 to the load balancer service 210. Specifically, the load balancer manager 126B may obtain the external IP address through a networking controller 128B of the gateway computing cluster 100B. The networking controller 128B may be MetalLB or Kube VIP in implementations where the gateway computing cluster 100B is a Kubernetes® Cluster. A pool of external IP addresses for the external network 206 may be allocated to the gateway computing cluster 100B (e.g., to the networking controller 128B) by the external network 206. The networking controller 128B may select the external IP address for the load balancer service 210 from the address pool, and also announce that assignment to the external network 206 so that the external network 206 is aware the external IP address has been assigned to a service in the gateway computing cluster 100B. The announcement of the external IP address assignment may be via a networking protocol. Examples of suitable networking protocols include Address Resolution Protocol (ARP), Neighbor Discovery Protocol (NDP), or Border Gateway Protocol (BGP), and the like. The load balancer manager 126B configures the reverse proxy of the load balancer service 210 to forward client requests received at the external IP address to the internal IP address and port number of the tenant service 208.

Optionally, the load balancer manager 126B sends the external IP address back to the load balancer worker 126A. The load balancer worker 126A then updates the tenant computing cluster 100A. Specifically, the load balancer worker 126A updates the definition of the tenant service 208 to include the external IP address, so that the tenant computing cluster 100A and the gateway computing cluster 100B are each configured with the external IP address of the load balancer service 210. Accordingly, a user may view the external IP address through a management interface of the tenant computing cluster 100A. For example, when the management interface is kubectl, the external IP address may be viewed by running "kubernetes get services <service>" where <service> is the name of the tenant service 208.

Optionally, the DNS servers of the tenant computing cluster 100A and the gateway computing cluster 100B may be updated with the DNS name of the tenant service 208. When a DNS name for the tenant service 208 is specified in the configuration for the tenant service 208, the first DNS server 116A of the tenant computing cluster 100A may be updated with a DNS record including that DNS name and the external IP address. The first DNS server 116A may forward that DNS record to the second DNS server 116B of the gateway computing cluster 100B so it is updated to contain that DNS record. Thus, the tenant computing cluster 100A and the gateway computing cluster 100B are each configured with the DNS record for the tenant service 208 and may each access the tenant service 208 by its DNS name. The first DNS server 116A may be ExternalDNS and the second DNS server 116B may be PowerDNS in implementations where the computing clusters are Kubernetes® Clusters.

Accordingly, the external IP address may be used to reach the tenant service 208 from the external network 206. Specifically, a request from a client 204 in the external network 206 is received by the load balancer service 210 at the external IP address and an external port number. The reverse proxy of the load balancer service 210 then forwards the request to the internal IP address and port number of the tenant service 208. Thus, security of the internal network 202 may be maintained while still allowing the tenant service 208 to be accessed from the external network 206. Additionally, the load balancer service 210 may be automatically deployed in a self-service manner.

Figure 3:
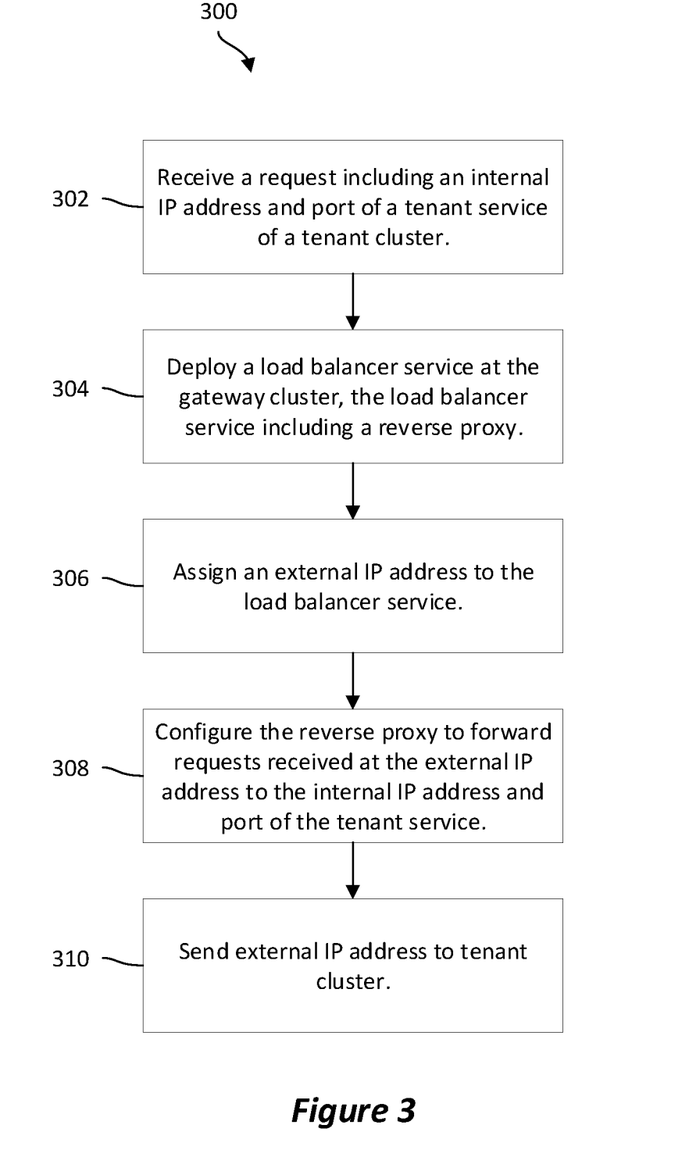
FIG. 3 is a diagram of a load balancer deployment method, according to some implementations.

FIG. 3 is a diagram of a load balancer deployment method 300, according to some implementations. The load balancer deployment method 300 will be described in conjunction with FIG. 2. The load balancer deployment method 300 may be performed by the load balancer manager 126B of the gateway computing cluster 100B. In step 302, the load balancer manager 126B receives a request for a load balancer service. The request includes an internal IP address and an internal port of the tenant service 208 of the tenant computing cluster 100A. The request may be received from the load balancer worker 126A of the tenant computing cluster 100A. In step 304, the load balancer manager 126B deploys the load balancer service 210 at the gateway computing cluster 100B in response to receiving the request. The load balancer service includes a reverse proxy, such as an nginx web server. In step 306, the load balancer manager 126B assigns an external IP address of an external network 206 to the load balancer service 210. The external IP address may be obtained via the networking controller 128B and the assignment of the external IP address may be announced to the external network 206. In step 308, the load balancer manager 126B configures the reverse proxy of the load balancer service 210 to forward client requests received at the external IP address to the internal IP address and port of the tenant service 208. In step 310, the load balancer manager 126B sends the external IP address back to the tenant computing cluster 100A, and specifically, to the load balancer worker 126A. In response to receiving the external IP address from the load balancer manager 126B, the load balancer worker 126A updates the definition of the tenant service 208 to include the external IP address.

Figure 4:
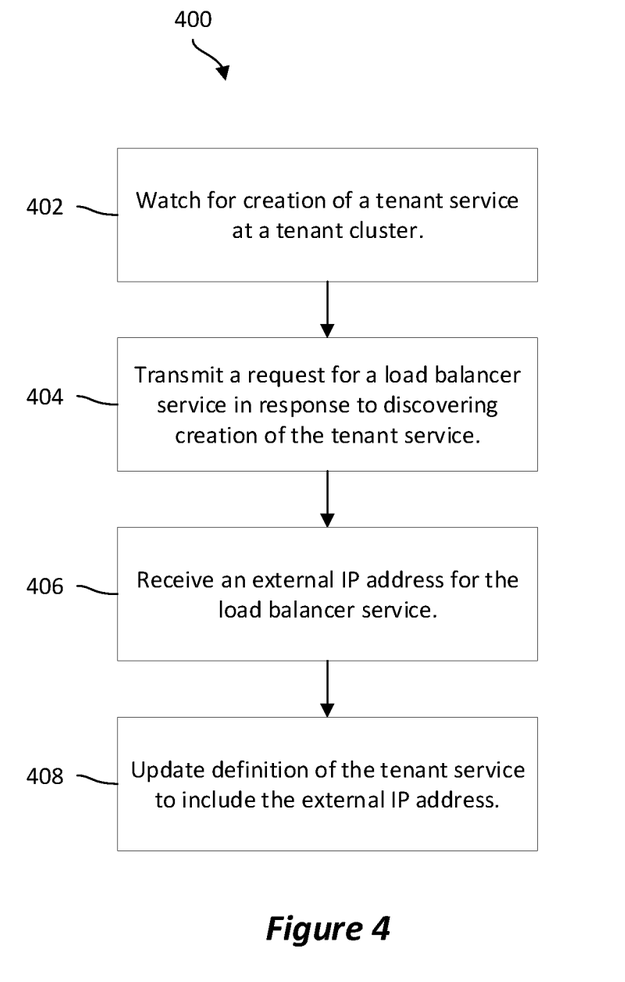
FIG. 4 is a diagram of a load balancer request method, according to some implementations.

FIG. 4 is a diagram of a load balancer request method 400, according to some implementations. The load balancer request method 400 will be described in conjunction with FIG. 2. The load balancer request method 400 may be performed by the load balancer worker 126A of the tenant computing cluster 100A. In step 402, the load balancer worker 126A watches for the creation of the tenant service 208 at the tenant computing cluster 100A. The load balancer worker 126A may do so by querying the API server of the tenant computing cluster 100A. In step 404, the load balancer worker 126A transmits a request for a load balancer service in response to discovering the creation of the tenant service 208. The request may be transmitted to the load balancer manager 126B of the gateway computing cluster 100B. In step 406, the load balancer worker 126A receives an external IP address for the load balancer service 210. In step 408, the load balancer worker 126A updates the definition of the tenant service 208 to include the external IP address. For example, when the tenant service 208 is configured using YAML, the YAML configuration may be automatically updated to include the external IP address.

Although FIGS. 2-4 illustrate and are described with respect to a single tenant computing cluster 100A, it should be appreciated that multiple tenant computing clusters may be utilized. The tenant computing clusters may (or may not) be in different internal networks. The gateway computing cluster 100B may be used to expose, to an external network, tenant services running on the tenant computing clusters.

Figure 5:
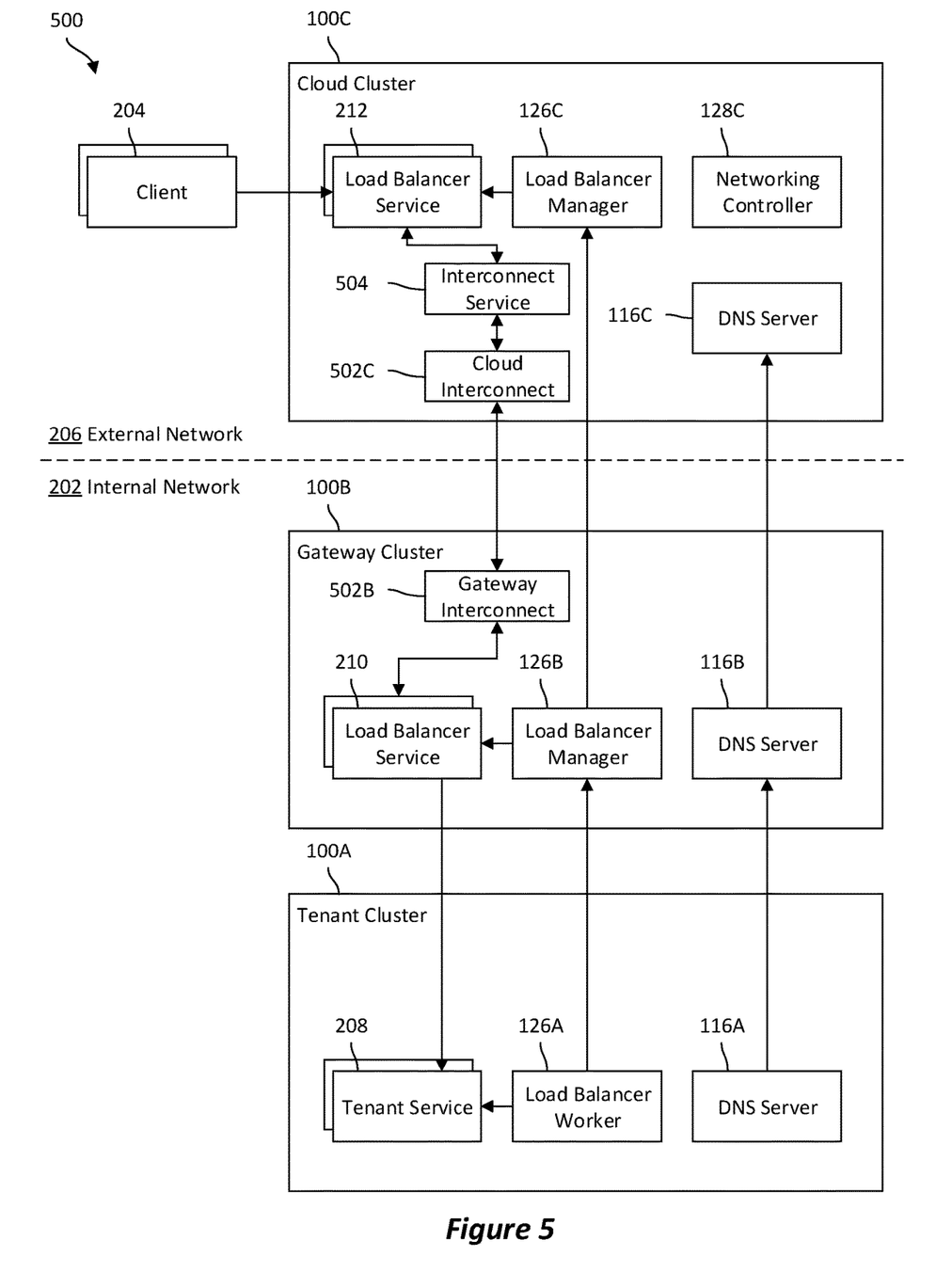
FIG. 5 is a schematic diagram of a computing cluster load balancer system, according to some implementations.

FIG. 5 is a schematic diagram of a computing cluster load balancer system 500, according to some implementations. The computing cluster load balancer system 500 is similar to the computing cluster load balancer system 200 described for FIG. 2, except the external network 206 is a public network such as the Internet. The computing cluster load balancer system 500 further includes a cloud computing cluster 100C in the external network 206. The cloud computing cluster 100C is similar to the computing cluster 100 of FIG. 1A. In an example implementation, the cloud computing cluster 100C is hosted with a managed computing cluster service, such as Amazon EKS or the like, which may be in a public cloud. As subsequently described in greater detail, a cloud load balancer service 212 will be created at the cloud computing cluster 100C. The cloud load balancer service 212 includes a plurality of pods of the cloud computing cluster 100C. The tenant service 208 will be exposed to the clients 204 through a combination of the load balancer service 210 and the cloud load balancer service 212.

The cloud computing cluster 100C is located remotely from the tenant computing cluster 100A and the gateway computing cluster 100B. Specifically, the cloud computing cluster 100C may be hosted in a cloud data center, which is located in a different geographic area than the on-premises data center where the tenant computing cluster 100A and the gateway computing cluster 100B are located. A computing cluster interconnect may be utilized to enable communication between the cloud computing cluster 100C and the gateway computing cluster 100B. The computing cluster interconnect may be a layer 7 service interconnect, such as Skupper in implementations where the computing clusters are Kubernetes® Clusters. In such an implementation, the gateway computing cluster 100B includes a gateway interconnect 502B and the cloud computing cluster 100C includes a cloud interconnect 502C. The gateway interconnect 502B and the cloud interconnect 502C may be containerized applications that are orchestrated on the gateway computing cluster 100B and the cloud computing cluster 100C, respectively. The gateway interconnect 502B and the cloud interconnect 502C may each include a proxy and a router, which are configured (e.g., using a management interface) to create a Virtual Application Network (VAN) that connects the applications and services in the gateway computing cluster 100B and the cloud computing cluster 100C. In implementations where Skupper is utilized, the gateway interconnect 502B may be configured as a Skupper agent and the cloud interconnect 502C may be configured as a Skupper hub. As subsequently described in greater detail, the cloud interconnect 502C will deploy an interconnect service 504 in the cloud computing cluster 100C.

The cloud computing cluster 100C further includes a cloud load balancer manager 126C. The cloud load balancer manager 126C is similar to the load balancer controller 126 of FIG. 1A, except is adapted to perform different a control loop than the load balancer worker 126A. The cloud load balancer manager 126C is upstream of the load balancer manager 126B, and will be used to automatically deploy the cloud load balancer service 212 upon creation of the load balancer service 210.

During operation, the load balancer worker 126A watches for the configuration of a particular attribute for the tenant service 208. Specifically, the tenant service 208 may be configured such that the service object for the tenant service 208 is annotated with a public attribute. For example, when the tenant service 208 is configured using YAML, the YAML configuration for the tenant service 208 may be set to contain "public: true" by a management interface for the tenant computing cluster 100A.

When the load balancer worker 126A discovers the configuration of the public attribute for the tenant service 208, it sends a request for a public load balancer to the load balancer manager 126B. The load balancer manager 126B may then set the load balancer service 210 to have the same attribute. Then, the load balancer manager 126B sends a request for a cloud load balancer to the cloud load balancer manager 126C. In response to receiving the request, the cloud load balancer manager 126C deploys the interconnect service 504 and the cloud load balancer service 212.

The interconnect service 504 is deployed in the cloud computing cluster 100C. In an example implementation, the interconnect service 504 is a Kubernetes® Service having a ClusterIP service type. When the interconnect service 504 is created, the cloud computing cluster 100C obtains an IP address for the interconnect service 504. As a result, the load balancer service 210 is exposed to the cloud computing cluster 100C through the interconnect service 504. Components of the cloud computing cluster 100C may communicate with components of the gateway computing cluster 100B via the IP address of the interconnect service 504. Thus, the load balancer manager 126B connects the load balancer service 210 and the interconnect service 504 to one another.

The cloud load balancer service 212 is deployed in the cloud computing cluster 100C, in a similar manner as to how the load balancer manager 126B deployed the load balancer service 210 in the gateway computing cluster 100B. The cloud load balancer service 212 also includes a cloud reverse proxy, which will be configured in a similar manner as the load balancer service 210. The cloud reverse proxy may be an nginx web server or the like. For example, the cloud load balancer service 212 may include a plurality of pods, which include containers for nginx web server(s), and deploying the cloud load balancer service 212 may include deploying those containers. In an example implementation, the cloud load balancer service 212 is a Kubernetes® Service of LoadBalancer service type. The cloud load balancer manager 126C then configures the cloud reverse proxy (e.g., the nginx web server(s)) of the cloud load balancer service 212, such as by automatically editing the configuration file(s) of the nginx web server(s). Specifically, the IP address and port number of the interconnect service 504 are specified as the back-end server for the cloud reverse proxy. Additionally, the cloud load balancer manager 126C assigns an external IP address (e.g., a public IP address) for the external network 206 to the cloud load balancer service 212. Specifically, the cloud load balancer manager 126C may obtain the external IP address through a networking controller 128C of the cloud computing cluster 100C. The networking controller 128C may be MetalLB or Kube VIP in implementations where the cloud computing cluster 100C is a Kubernetes® Cluster. Thus, the cloud load balancer manager 126C configures the cloud reverse proxy to forward client requests received at the external IP address to the IP address and port number of the interconnect service 504.

Optionally, the cloud load balancer manager 126C sends the external IP address back to the load balancer manager 126B, which forwards it to the load balancer worker 126A. The load balancer worker 126A and the load balancer manager 126B update the tenant computing cluster 100A and the gateway computing cluster 100B, respectively. Specifically, the load balancer worker 126A updates the definition of the tenant service 208 to include the external IP address, and the load balancer manager 126B updates the definition of the load balancer service 210 to include the external IP address, so that the tenant computing cluster 100A, the gateway computing cluster 100B, and the cloud computing cluster 100C are each configured with the external IP address of the cloud load balancer service 212. Accordingly, a user may view the external IP address through a management interface of the tenant computing cluster 100A. For example, when the management interface is kubectl, the external IP address may be viewed by running "kubernetes get services <service>" where <service> is the name of the tenant service 208.

Optionally, the DNS servers of the tenant computing cluster 100A, the gateway computing cluster 100B, and the cloud computing cluster 100C may be updated with the DNS name of the tenant service 208. When a DNS name for the tenant service 208 is specified in the configuration for the tenant service 208, the first DNS server 116A of the tenant computing cluster 100A may be updated with a DNS record including that DNS name and the external IP address. The first DNS server 116A may forward that DNS record to the second DNS server 116B of the gateway computing cluster 100B so it is updated to contain that DNS record. The second DNS server 116B may forward that DNS record to the third DNS server 116C of the cloud computing cluster 100C so it is updated to contain that DNS record. Thus, the tenant computing cluster 100A, the gateway computing cluster 100B, and the cloud computing cluster 100C are each configured with the DNS record for the tenant service 208 and may each access the tenant service 208 by its DNS name.

Accordingly, the external IP address may be used to reach the tenant service 208 from the external network 206. Specifically, a request from a client 204 in the external network 206 is received by the cloud load balancer service 212 at the external IP address and an external port number. The reverse proxy of the cloud load balancer service 212 then forwards the request to the internal IP address and port number of the interconnect service 504, which forwards the request to the load balancer service 210 via the gateway interconnect 502B and the cloud interconnect 502C. The reverse proxy of the load balancer service 210 then forwards the request to the internal IP address and port number of the tenant service 208. Thus, security of the internal network 202 may be maintained while still allowing the tenant service 208 to be accessed from the external network 206.

Figure 6:
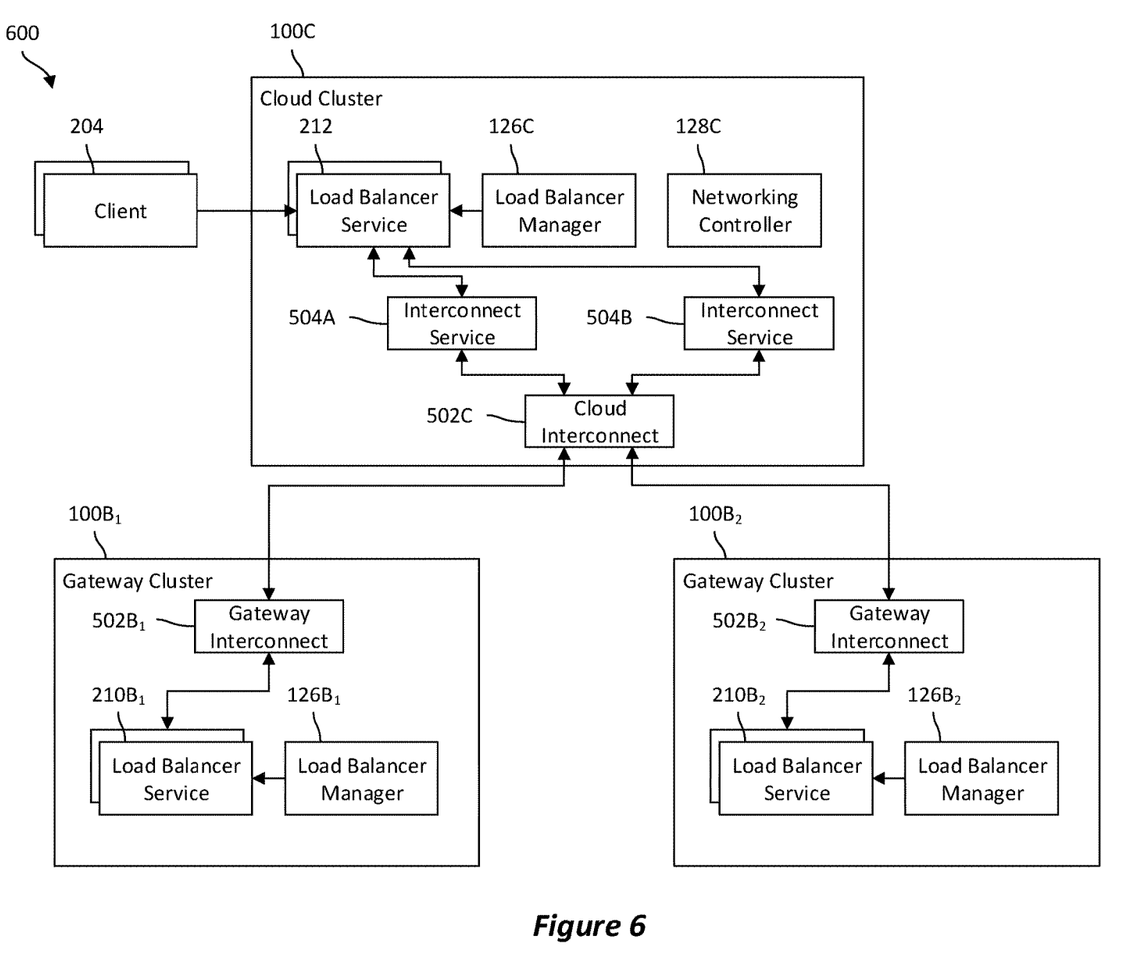
FIG. 6 is a schematic diagram of a computing cluster load balancer system, according to some implementations.

FIG. 6 is a schematic diagram of a computing cluster load balancer system 600, according to some implementations. The computing cluster load balancer system 600 is similar to the computing cluster load balancer system 500 described for FIG. 5, except the cloud computing cluster 100C communicates with a first gateway computing cluster 100B$_1$ and a second gateway computing cluster 100B$_2$. The first gateway computing cluster 100B$_1$ is in a first internal network, the second gateway computing cluster 100B$_2$ is in a second internal network, and the cloud computing cluster 100C is in an external network that is external to both the first and second internal network.

A first load balancer service 210B$_1$ will be created at the first gateway computing cluster 100B$_1$ and a second load balancer service 210B$_2$ will be created at the second gateway computing cluster 100B$_2$. The first load balancer service 210B$_1$ and the second load balancer service 210B$_2$ may each be similar to the load balancer service 210 described for FIG. 2. The cloud computing cluster 100C includes a first interconnect service 504A and a second interconnect service 504B. The first interconnect service 504A and the second interconnect service 504B may each be similar to the interconnect service 504 described for FIG. 5. The first load balancer service 210B$_1$ is exposed to the cloud computing cluster 100C through the first interconnect service 504A, and the second load balancer service 210B$_2$ is exposed to the cloud computing cluster 100C through the second interconnect service 504B, each in a similar manner as previously described.

The first load balancer service 210B$_1$ and the second load balancer service 210B$_2$ may each be configured such that the service objects for the services are annotated with a shared key attribute. For example, when the first load balancer service 210B$_1$ and the second load balancer service 210B$_2$ are configured using YAML, the YAML configurations for the first load balancer service 210B$_1$ and the second load balancer service 210B$_2$ may each be set to contain "siteSharedKey: <id>" by a management interface, where <id> is a shared unique identifier, such as an integer, a string, or the like. The shared unique identifier may be transmitted to the cloud load balancer manager 126C. The cloud load balancer manager 126C configures the reverse proxy (e.g., the nginx web server(s)) of the cloud load balancer service 212, such as by automatically editing the configuration file(s) of the nginx web server(s). Specifically, the IP address and port number of the first interconnect service 504A and the second interconnect service 504B are specified as the back-end servers for the reverse proxy. The reverse proxy may be further configured to load balance client requests between the first interconnect service 504A and the second interconnect service 504B. Accordingly, requests from the clients 204 may be load balanced across different gateway computing clusters (e.g., the first gateway computing cluster 100B$_1$ and the second gateway computing cluster 100B$_2$). The first gateway computing cluster 100B$_1$ is located remotely from the second gateway computing cluster 100B$_2$. Specifically, the first gateway computing cluster 100B$_1$ and the second gateway computing cluster 100B$_2$ may be hosted in different on-premises data centers, which are located in different geographic areas. Site-level high availability may thus be obtained across different geographic areas, thereby improving reliability of a private cloud.

In an example implementation consistent with the features disclosed herein, a system includes: a tenant computing cluster in a first internal network, the tenant computing cluster configured to: watch for creation of a tenant service at the tenant computing cluster; and transmit a request in response to discovering the creation of the tenant service; and a first gateway computing cluster at an edge of the first internal network and an external network, the first gateway computing cluster configured to: receive the request from the tenant computing cluster; deploy a first load balancer service at the first gateway computing cluster in response to receiving the request; assign an external IP address for the external network to the first load balancer service; configure the first load balancer service to forward client requests received at the external IP address to the tenant service; and send the external IP address to the tenant computing cluster. In another example implementation of the system, the tenant computing cluster is further configured to: receive the external IP address from the first gateway computing cluster; and update a definition of the tenant service to include the external IP address. In another example implementation of the system, the first gateway computing cluster is further configured to: select the external IP address from a pool of IP addresses allocated to the first gateway computing cluster; and announce assignment of the external IP address to the external network. In another example implementation of the system, the request includes an internal IP address and port of the tenant service, the first load balancer service includes a first reverse proxy, and the first gateway computing cluster is configured to configure the first load balancer service by configuring the first reverse proxy to forward the client requests received at the external IP address to the internal IP address and port of the tenant service. In another example implementation of the system, the tenant computing cluster and the first gateway computing cluster each include a manager node and a plurality of worker nodes. In another example implementation, the system further includes: a cloud computing cluster in the external network, the cloud computing cluster configured to: connect a first interconnect service of the cloud computing cluster to the first load balancer service; deploy a cloud load balancer service at the cloud computing cluster; and configure the cloud load balancer service to forward client requests received from the external network to the first interconnect service. In another example implementation of the system, the first gateway computing cluster is further configured to: receive the external IP address from the cloud computing cluster; and update a definition of the first load balancer service to include the external IP address. In another example implementation of the system, the first interconnect service is connected to the first load balancer service with a layer 7 service interconnect. In another example implementation, the system further includes: a second gateway computing cluster at an edge of a second internal network and the external network, the second gateway computing cluster configured to: deploy a second load balancer service at the second gateway computing cluster, where the cloud computing cluster is further configured to connect a second interconnect service of the cloud computing cluster to the second load balancer service.

In an example implementation consistent with the features disclosed herein, a method includes: receiving, by a load balancer manager of a gateway computing cluster, a request including an internal IP address and port of a tenant service of a tenant computing cluster, the gateway computing cluster being in an external network, the tenant computing cluster being in an internal network, the internal IP address being for the internal network; deploying, by the load balancer manager, a load balancer service at the gateway computing cluster in response to receiving the request; assigning, by the load balancer manager, an external IP address for the external network to the load balancer service; configuring, by the load balancer manager, the load balancer service to forward client requests received at the external IP address to the internal IP address and port of the tenant service; and sending, by the load balancer manager, the external IP address to the tenant computing cluster. In another example implementation, the method further includes: selecting the external IP address from a pool of IP addresses allocated to the gateway computing cluster; and announce assignment of the external IP address to the external network via a networking protocol. In another example implementation of the method, the request is received from a load balancer worker of the tenant computing cluster, and the load balancer manager sends the external IP address to the load balancer worker. In another example implementation of the method, the load balancer worker is a first controller of the tenant computing cluster and the load balancer manager is a second controller of the gateway computing cluster. In another example implementation of the method, the load balancer service includes a plurality of first pods of the gateway computing cluster and the tenant service includes a plurality of second pods of the tenant computing cluster. In another example implementation, the method further includes: connecting, by the load balancer manager, the load balancer service to an interconnect service of a cloud computing cluster. In another example implementation of the method, the load balancer service is connected to the interconnect service with a layer 7 service interconnect. In another example implementation, the method further includes: receiving the external IP address from the cloud computing cluster. In another example implementation of the method, the load balancer service includes a reverse proxy, and configuring the load balancer service includes configuring the reverse proxy to forward the client requests received at the external IP address to the internal IP address and port of the tenant service.

In an example implementation consistent with the features disclosed herein, a non-transitory computer readable medium stores instructions which, when executed by a processor, cause the processor to: receive a request including an internal IP address and port of a tenant service of a tenant computing cluster; deploy a load balancer service at a gateway computing cluster in response to receiving the request, the load balancer service including a reverse proxy; assign an external IP address to the load balancer service; configure the reverse proxy to forward client requests received at the external IP address to the internal IP address and port of the tenant service; and send the external IP address to the tenant computing cluster. In another example implementation of the non-transitory computer readable medium, the internal IP address is for a private cloud and the external IP address is for a public cloud.

The foregoing outlines features of several examples so that those skilled in the art may better understand the aspects of the present disclosure. Various modifications and combinations of the illustrative examples, as well as other examples, will be apparent to persons skilled in the art upon reference to the description. It is therefore intended that the appended claims encompass any such modifications.

What is claimed is:

1. A system comprising:
   a tenant computing cluster in a first internal network, the tenant computing cluster comprising a domain name system (DNS) server and a first controller, the first controller to:
   detect creation of a tenant service at the tenant computing cluster; and
   transmit a request for a load balancer service based on detecting the creation of the tenant service, the request comprising an internal Internet Protocol (IP) address of the tenant service; and
   a first gateway computing cluster at an edge of the first internal network and an external network, the first gateway computing cluster comprising a second controller to:
   receive the request from the first controller in the tenant computing cluster;
   deploy a first load balancer service at the first gateway computing cluster in response to receiving the request;
   assign an external IP address for the external network to the first load balancer service;
   configure the first load balancer service to forward client requests received at the external IP address to the internal IP address of the tenant service; and
   send the external IP address to the tenant computing cluster,
   wherein the DNS server of the tenant computing cluster is to update a DNS record at the DNS server with a DNS name of the tenant service and the external IP address, and wherein the tenant service is accessible using the DNS name of the tenant service.

2. The system of claim 1, wherein the first controller of the tenant computing cluster is to further:
   receive the external IP address from the first gateway computing cluster; and
   update a definition of the tenant service to include the external IP address.

3. The system of claim 1, wherein the second controller of the first gateway computing cluster is to further:
   select the external IP address from a pool of IP addresses allocated to the first gateway computing cluster; and
   announce assignment of the external IP address to the external network.

4. The system of claim 1, wherein the first load balancer service comprises a first reverse proxy to forward the client requests received at the external IP address to the internal IP address of the tenant service.

5. The system of claim 1, wherein the tenant computing cluster and the first gateway computing cluster each comprise a manager node and a plurality of worker nodes.

6. The system of claim 1, wherein the first gateway computing cluster further comprises a gateway DNS server, and wherein the DNS server of the tenant computing cluster is to send the DNS record to the gateway DNS server so the gateway DNS server is updated with the DNS record.

7. The system of claim 1, further comprising:
   a cloud computing cluster in the external network, the cloud computing cluster to:
   connect a first interconnect service of the cloud computing cluster to the first load balancer service;
   deploy a cloud load balancer service at the cloud computing cluster; and
   configure the cloud load balancer service to forward client requests received from the external network to the first interconnect service.

8. The system of claim 7, wherein the second controller of the first gateway computing cluster is to further:
   receive an external IP address of the cloud load balancer service from the cloud computing cluster; and
   update a definition of the first load balancer service to include the external IP address of the cloud load balancer service.

9. The system of claim 7, wherein the first interconnect service is connected to the first load balancer service with a layer 7 service interconnect.

10. A method comprising:
    receiving, by a load balancer manager of a gateway computing cluster, a request comprising an internal Internet Protocol (IP) address of a tenant service of a tenant computing cluster, the gateway computing cluster connected to an external network, the tenant computing cluster being in an internal network, and the internal IP address being for the internal network;
    deploying, by the load balancer manager, a load balancer service at the gateway computing cluster as a response to the request;
    assigning, by the load balancer manager, an external IP address for the external network to the load balancer service;
    configuring, by the load balancer manager, the load balancer service to forward client requests received at the external IP address to the internal IP address of the tenant service;
    sending, by the load balancer manager, the external IP address to the tenant computing cluster; and
    updating, by a DNS server of the tenant computing cluster, a DNS record at the DNS server with a DNS name of the tenant service and the external IP address, wherein the tenant service in the tenant computing cluster is accessible by a client using the DNS name of the tenant service.

11. The method of claim 10, further comprising:
    selecting, by the load balancer manager, the external IP address from a pool of IP addresses allocated to the gateway computing cluster; and announce assignment of the external IP address to the external network via a networking protocol.

12. The method of claim 10, wherein the load balancer service comprises a plurality of first pods of the gateway computing cluster, and the tenant service comprises a plurality of second pods of the tenant computing cluster.

13. The method of claim 10, further comprising:
sending, by the DNS server of the tenant computing cluster, the DNS record to a gateway DNS server of the gateway computing cluster so the gateway DNS server is updated with the DNS record.

14. The method of claim 10, wherein the load balancer service comprises a reverse proxy, and wherein configuring the load balancer service comprises configuring the reverse proxy to forward the client requests received at the external IP address to the internal IP address of the tenant service.

15. The method of claim 10, wherein the request is received from a load balancer worker of the tenant computing cluster, and the load balancer manager sends the external IP address to the load balancer worker.

16. The method of claim 15, wherein the load balancer worker is a first controller of the tenant computing cluster, and the load balancer manager is a second controller of the gateway computing cluster.

17. The method of claim 10, further comprising:
connecting, by the load balancer manager, the load balancer service to an interconnect service of a cloud computing cluster.

18. The method of claim 17, wherein the load balancer service is connected to the interconnect service with a layer 7 service interconnect.

19. A non-transitory computer readable medium storing comprising instructions that upon execution cause a system to:
receive a request comprising an internal Internet Protocol (IP) address of a tenant service of a tenant computing cluster;
deploy a load balancer service at a gateway computing cluster in response to receiving the request, the load balancer service comprising a reverse proxy;
assign an external IP address to the load balancer service;
configure the reverse proxy to forward client requests received at the external IP address to the internal IP address of the tenant service;
send the external IP address to the tenant computing cluster; and
update, by a DNS server of the tenant computing cluster, a DNS record at the DNS server with a DNS name of the tenant service and the external IP address, wherein the tenant service in the tenant computing cluster is accessible by a client using the DNS name of the tenant service.

20. The non-transitory computer readable medium of claim 19, wherein the internal IP address is for a private cloud and the external IP address is for a public cloud.

* * * * *